Sept. 23, 1958

M. G. JAENKE 2,853,558

SELECTIVE CALL RECEIVER

Filed Feb. 19, 1954

INVENTOR
M. JANKE
BY Philip M. Bolton
ATTORNEY

United States Patent Office 2,853,558

Patented Sept. 23, 1958

2,853,558

SELECTIVE CALL RECEIVER

Martin G. Jaenke, Alamogordo, N. Mex., assignor to International Standard Electric Corporation, New York, N. Y., a corporation of Delaware Application February 19, 1954, Serial No. 411,364

Claims priority, application Germany February 21, 1953

6 Claims. (Cl. 179—85)

Figures 1, 2:
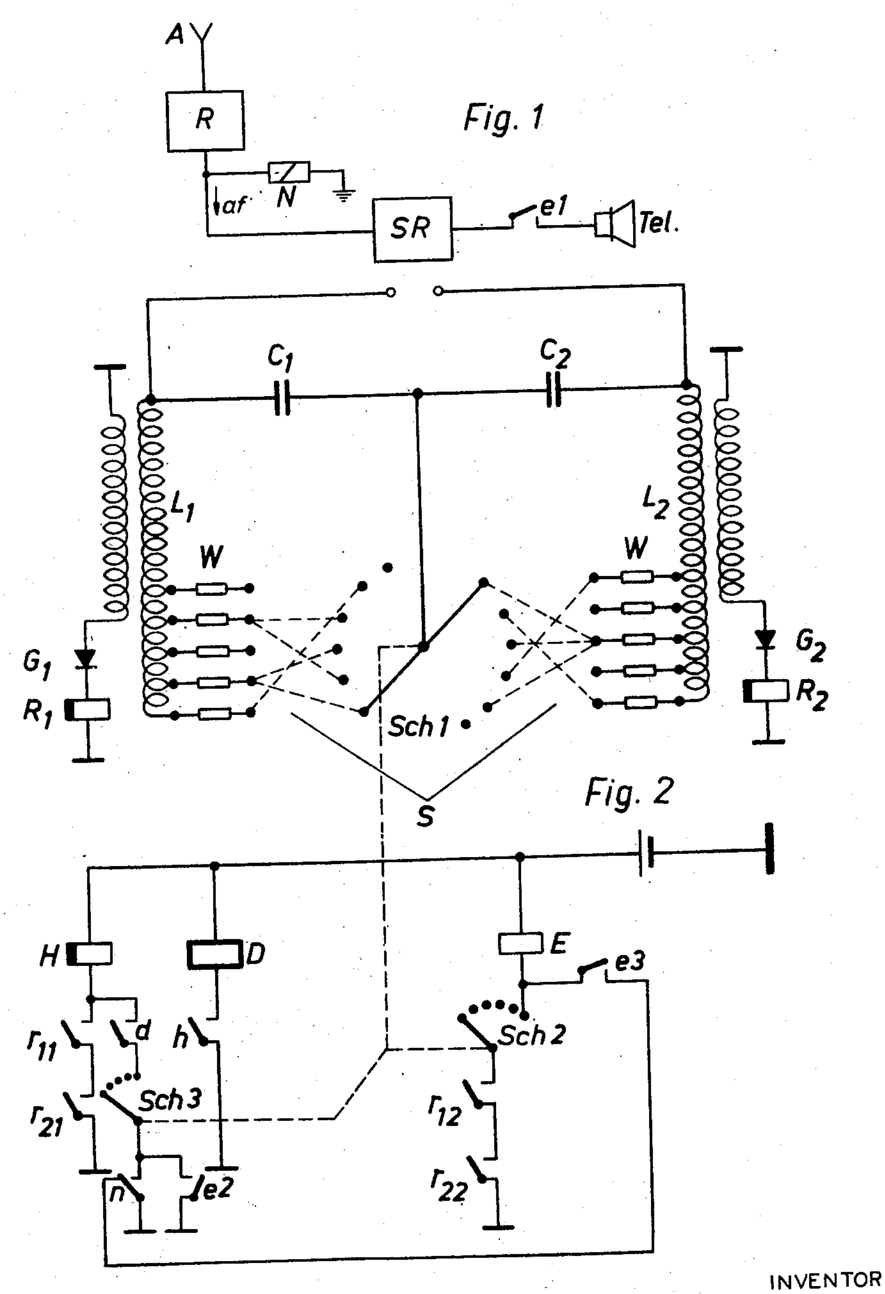

The invention relates to selective call receivers of the kind in which the time-succession of several calling frequencies is used as a selecting signal.

The number of frequencies in selective call systems, operating according to the frequency code method, is the base for producing a criterion (signal) which selects one predetermined receiver out of a plurality of receivers. The number of frequencies required for this purpose depends on the number of subscribers involved and on the type of frequency-combination principle employed. Utilization of time-succession frequencies (frequency-code) for the production of a calling signal for a given receiver, is known. Frequency-code systems have met with wide approval because of their service reliability and their adaptability to serve a large number of subscribers with a relatively small number of necessary frequencies. It is also known that the number of required frequencies to serve a given system comprising a certain number of subscribers, is the most important factor in the expense of the system. The demand for service reliability, furthermore makes it necessary that the number of these possible frequencies does not become excessive and that a certain time limit be provided for transmitting the complete calling signal.

In modern-type selective call systems the composition of the calling signals out of a number of possible frequencies is carried out generally in such a way that a limited number of frequencies, e. g. two frequencies out of five possible ones, are selected and are transmitted simultaneously or in a predetermined timed sequence. According to a more recent proposal it is possible to substantially increase the number of subscriber calling signals by transmitting combinations of the frequencies one after another in a predetermined timed sequence.

With regard thereto it is necessary to equip the selective receivers, which are associated with the individual subscribers' stations, with means selectively responsive to each one of the possible frequencies. Generally, oscillatory circuits are employed as the selective means, and are coupled via a demodulation circuit to the antenna of the receiving station and, upon being energized, initiate the necessary switching operations. Accordingly, a tuned oscillatory circuit must be provided in each receiver for each one of the possible frequencies. These oscillatory circuits represent a considerable part of the total expense of the equipment and it is therefore desirable to reduce the number of oscillatory circuits to a minimum, without reducing the number of frequency combinations.

According to the present invention there are provided oscillatory circuits which are capable of being switched-over to each of the possible frequencies. Accordingly, the selecting signal consisting, for instance, of several different possible frequencies is transmitted in a predetermined time succession. According to the invention the receiver responds to the frequency to which it is originally set (first frequency of a plurality of frequencies to which the receiver is successively tuned) and automatically switches over to the next successive frequency until finally all of the frequencies transmitted successively which characterize this particular subscriber, releases a call indication, and puts the receiver in the ready-to-receive condition.

With regard to systems of the kind in which a successive transmission of frequency combinations is performed during the calling, the number of selective means which are assigned to each receiver and designed according to this invention, depend on the maximum number of simultaneously transmitted frequencies comprising a frequency combination.

An example of one embodiment of the invention is described with reference to a system of the kind in which, five frequency combinations are transmitted successively, each combination consisting of two out of five possible frequencies. This system is particularly adaptable for connection to a normal-type telephone system, because the individual combinations of two out of five frequencies include ten possibilities, so that each one of these frequency combinations may represent one digit. Hence, the successive transmission of five frequency combinations of this kind, corresponds to a five-digit number. Consequently the system is capable of serving 100,000 subscribers. Since in this case, at the maximum, two frequencies are transmitted at the same time, each receiver must be equipped with two oscillatory circuits, each one of which is capable of being switched-over to respond to the five possible frequencies.

The above and other features and objects of the invention will be more clearly appreciated from the following detailed description taken in conjunction with the accompanying drawing, in which Fig. 1 is a block diagram of a movable receiver station, and Fig. 2 is a circuit diagram of the selective call receiving equipment.

The complete receiver of the movable station is shown in Fig. 1 of the drawing as a block diagram. The letter A in this figure denotes the receiving antenna, R the actual high frequency receiver that is permanently ready to receive and the output voltage (*af*) of which is applied to the selective call receiver SR. This receiver only responds to the call signals transmitted by the central station and will be particularly described hereinafter. When the dial signals which are destined to the respective station have been received, then either the receiver (handset) of the telephone (Tel.) or a loudspeaker will be connected to the output of the receiver R by means of a contact $e_1$ of the relay E arranged in the selective call receiver. By the operation of further contacts of relay E there is initiated e. g. the release of an acoustic and/or optical call signal and the performance of other switching operations relating e. g. to the transmitter of the movable station and which, therefore, are not described herein.

Furthermore, in the diagram of the auto (vehicle) receiver there is shown a relay N, whose operation depends on the type of call system employed. With the system in connection with which the present invention was developed, a permanent audible signal indicating an idle channel is transmitted by the central station as long as the respective channel is not engaged. Relay N remains operated or energized as long as this idle indication signal is transmitted. At the beginning of a dial operation the idle indication will be interrupted and relay N will release. It will only be re-energized when the seizure of the line is cancelled and when the idle indication signal is being transmitted again. In another system, e. g. where at the beginning and the end of the dialling there is transmitted a special indicating characteristic, this characteristic can be used for operating and releasing the relay N.

The employment of such a relay is part of the common practice and its mode of operation is of no particular importance to the object of this invention, which only relates to the actual selective call receiver.

A schematic circuit diagram of a selective call receiver, designed in accordance with the present invention, is shown schematically in Fig. 2. The selective device comprises two oscillatory circuits $L_1$, $C_1$, and $L_2$, $C_2$, to which all of the received calling signals are applied. The inductance coils $L_1$ and $L_2$ of these oscillatory circuits are each provided with five taps whereby each oscillatory circuit may be timed to five different resonance frequencies which correspond to the five calling frequencies that are used for performing the selection. The resonance frequencies, which were initially set by means of the switch $Sch_1$ (in the illustrated position of the wiper), correspond to the two frequencies of the first one out of the five frequency combinations which are assigned to the receiver. Hence when receiving the two frequencies, for which the two oscillatory circuits originally were resonant, the relays $R_1$ and $R_2$ will be energized by the current which has been rectified by the rectifiers $G_1$ and $G_2$. The contacts $r_{21}$ and $r_{11}$ of relays $R_2$ and $R_1$, respectively, complete the circuit for relay H, the contact $h$ of which again completes the circuit for the driving magnet D of the switch $Sch_1$, so that this switch will be stepped to the next position, thereby resetting the natural frequencies of the two oscillating circuits to those values which correspond to the second frequency combination that is assigned to the receiver. This procedure will be then repeated five times, when each time the received pairs of frequencies correspond to the natural frequencies of the oscillating circuits, i. e. if the call is actually directed to the receiver under consideration. After the arrival of the fifth frequency combination the swich $Sch_1$ will be moved to its sixth position. Likewise the switch $Sch_2$, which is synchronously driven with the switch $Sch_1$, will move to the sixth position and will complete thereby, while the contacts $r_{12}$ and $r_{22}$ of relays $R_1$ and $R_2$, respectively are still closed, the circuit for the relay E which, thereupon, causes the release of the call indication, and the ready-to-receive condition of the receiver. Of course, the switches $Sch_1$ and $Sch_2$ can also be combined in a three-armed switch. Under certain circumstances the switch $Sch_2$ may become superfluous, i. e. if the sixth position of the switch $Sch_1$ is used for actuating the relay E.

Besides the switching means, which are described hereinbefore, the selective call receiver comprises other means for returning the switches $Sch_1$ and $Sch_2$ to normal after the termination of the dialling in the conventional manner, and further comprises means for returning the switches to normal also when all of the frequency combination call signals are not received by the selective call receiver and the switches remained in an intermediate position. The switching means serving this purpose are shown in the lower part of Fig. 2.

The contact $n$ of relay N is shown in that position which it occupies either after the idle indication signal has ceased to be transmitted, or after the arrival of a dial starting signal. After relay E, whose function has been described in the foregoing, is energized it will hold itself via the contacts $e_3$ and $n$ as long as the switches $Sch_1$ and $Sch_2$, and the switch $Sch_3$, which is coupled thereto, do not move further.

Since via the further contact $e_2$ and the contact $d$ the circuit is completed for the relay H this relay, via its contact $h$, causes the stepping magnet D to move the switch arms $Sch_1$, $Sch_2$ and $Sch_3$ one step further, thus returning them to normal again. If the switch arms $Sch_1$, $Sch_2$, $Sch_3$ are provided with more contacts than are necessary for performing the actual switching operations, then the stepping movement will be repeated until the switches have reached their normal positions again.

Hence, whenever the respective station has been called, the switches will return to normal almost immediately after the end of the dialling. When not all of the dial signals are received by the receiver, e. g. only the three first ones, then the switches will remain in the last position occupied until relay N is re-energized, either at the new arrival of the signal at the end of the conversation, or at the arrival of the dial ending signal. The contact $n$ will then change over to the other position and completes, via contact $d$, the circuit for H. Contact $h$ causes the energization of the stepping magnet contact D, which advances the switches one step. At the same time contact $d$ will be interrupted so that H releases, thereby interrupting the circuit for D by contact $h$. Thereupon $d$ will close again and the procedure will be repeated until the switches have attained their normal position.

Hence it may be seen that the receiving circuit arrangement, which is assigned to each individual subscriber, and in spite of the relatively large number of subscribers, may be considerably simplified by the employment of a selecting device which is equipped according to the invention. The selective circuit arrangement is designed the same for each receiver. Merely the connection leads S, denoted in the drawing by dashlines, must be wired individually in accordance with the calling signals which are assigned to the individual receivers.

When employing the circuit arrangement according to the invention there may occur difficulties insofar as in the case of different settings of the resonance means, there will result different input resistances and coupling conditions. These difficulties, however, are easily eliminated. The selecting means are adjusted in accordance with the respective setting, in such a way that the total input resistance, independent of the setting, is made constant; for example resistors W may be added for this purpose.

While I have described above the principles of my invention in connection with specific apparatus, it is to be clearly understood that this description is made only by way of example and not as a limitation of the scope of my invention as set forth in the objects thereof and in the accompanying claims.

What is claimed is:

1. A frequency-selective receiver responsive to a given plurality of different frequencies received in timed-sequence relationship, comprising means for receiving said frequencies, a plurality of oscillatory circuits respectively tuned to each of said frequencies, a stepping switch coupling said receiving means to a given one of said oscillatory circuits, and means responsive to the frequency to which said one oscillatory circuit is tuned, for actuating said stepping-switch to uncouple said one oscillatory circuit and couple another of said oscillatory circuits to said receiving means.

2. The receiver according to claim 1 wherein said plurality of oscillatory circuits are divided into two groups, each group comprising a plurality of oscillatory circuits, and one oscillatory circuit in each group is adapted to respond simultaneously to two received frequencies, the number of oscillatory circuits in a group corresponding to the number of frequencies in a given-frequency code, to which the receiver is responsive.

3. The receiver according to claim 1, wherein said oscillatory circuits comprise a capacitor and an inductance, and means connecting said stepping-switch between said capacitor and different portions of said inductance.

4. The receiver according to claim 3 and further comprising means connected between said stepping-switch and said inductance for maintaining the resistance constant for each of the frequencies to which said oscillatory circuits are tuned.

5. A frequency-selective receiver responsive to a given plurality of different frequencies received in timed-sequence relationship, means for receiving said frequencies, a plurality of oscillatory circuits comprising a capacitor and an inductance having a plurality of taps corresponding to the number of frequencies adapted to be received, a stepping-switch preselectively coupled between said capacitor and one of said taps, whereby the oscillatory circuit is preselectively tuned to a first frequency, means responsive to the frequency to which said oscillatory circuit is preselectively tuned for actuating said stepping switch to disconnect the coupling from one tap and couple another of said taps, whereby the oscillatory circuit is sequentially tuned to a plurality of frequencies by operation of said stepping-switch.

6. The receiver according to claim 5, and further comprising a second plurality of oscillatory circuits coupled across the first of said oscillatory circuits, said second plurality of oscillatory circuits comprising a capacitor and an inductance having a plurality of taps corresponding to the number of frequencies adapted to be received, and said stepping-switch preselectively coupled between said last mentioned capacitor and one of said taps of said inductance, whereby said second oscillatory circuit is also preselectively tuned to a first frequency.

References Cited in the file of this patent

UNITED STATES PATENTS

| | | |
|---|---|---|
| 2,082,077 | Newby et al. | June 1, 1937 |
| 2,542,592 | Styren | Feb. 20, 1951 |